T. D. MOORE.
MOLD FOR MAKING ARTIFICIAL TEETH.
APPLICATION FILED APR. 8, 1911.
1,000,187.
Patented Aug. 8, 1911.
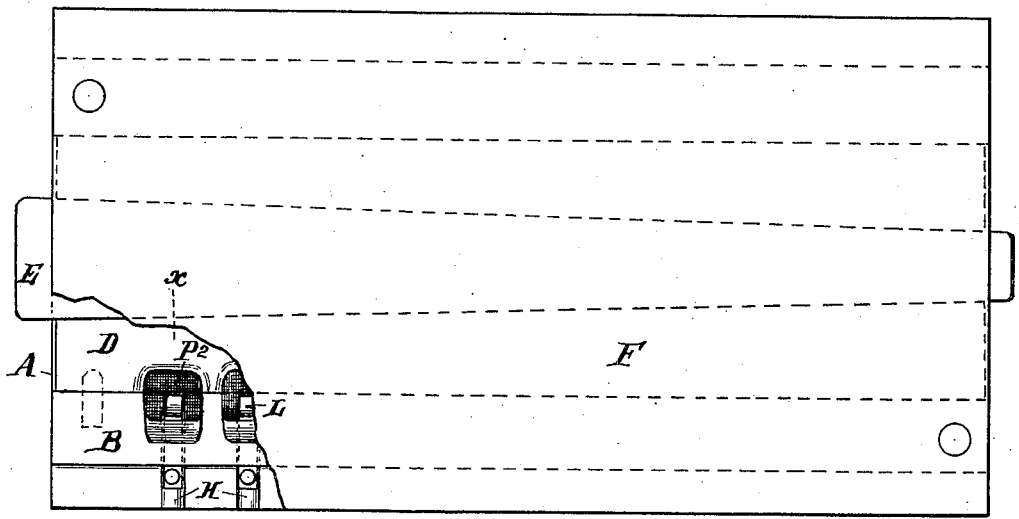
FIG. 1
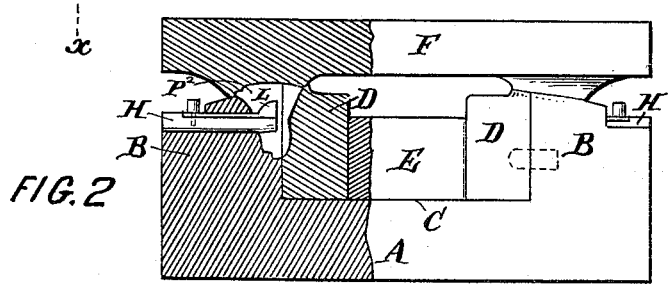
FIG. 2
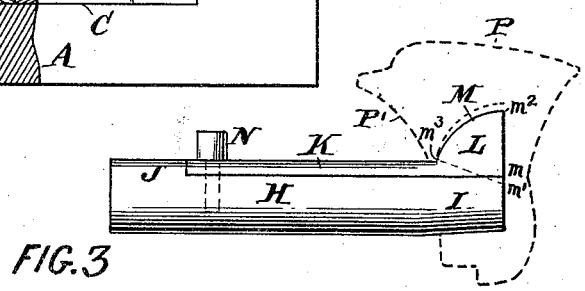
FIG. 3
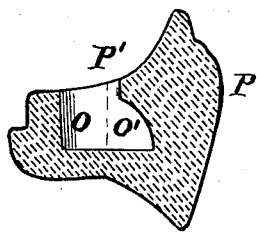
FIG. 6
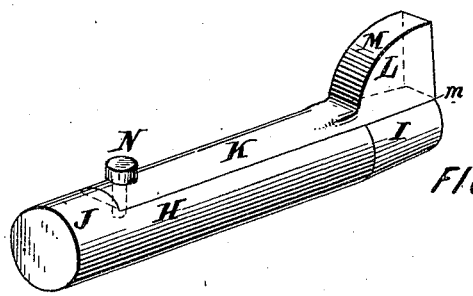
FIG. 4
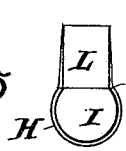
FIG. 5
Witnesses
Inventor
Thomas D. Moore
Attorney

UNITED STATES PATENT OFFICE.

THOMAS D. MOORE, OF PHILADELPHIA, PENNSYLVANIA, ASSIGNOR TO STANDARD DENTAL MANUFACTURING COMPANY, A CORPORATION OF PENNSYLVANIA.

MOLD FOR MAKING ARTIFICIAL TEETH.

1,000,187.      Specification of Letters Patent.      Patented Aug. 8, 1911.

Application filed April 8, 1911. Serial No. 619,705.

*To all whom it may concern:*

Be it known that I, THOMAS D. MOORE, a citizen of the United States, resident of Philadelphia, county of Philadelphia, State of Pennsylvania, have invented an Improvement in Molds for Making Artificial Teeth, of which the following is a specification.

My invention has reference to molds for making artificial teeth and consists of certain improvements which are fully set forth in the following specification and shown in the accompanying drawings which form a part thereof.

The object of my invention is to provide a construction of mold adapted for molding artificial teeth by which a suitable undercut aperture shall be formed in the tooth structure by which it may be attached to a supporting plate.

More particularly, my object is to provide a construction of mold for forming the said undercut hole in the tooth composition [before the same is hardened by heat] which will enable the mold structure to be readily withdrawn from the molded tooth with the least possible resistance and danger to breakage to the tooth in handling when removing the same from the mold.

My invention consists in a mold for the body of the tooth when formed of a plurality of parts which, when assembled, provide an internal space corresponding to the shape of the tooth to be molded and in which one of the parts is furnished with an inwardly directed stud combined with a removable shank portion having an enlarged head of special construction fully described hereinafter and which, together with the inwardly projecting stud, acts as a core about which the tooth is molded; the construction being such that, after the dismantling of the mold parts, the tooth may be withdrawn, together with the shank portion having the enlarged head, leaving a recess opening outward through the tooth and back of the enlarged head, whereby the rocking of the shank portion within the recess will cause the head thereof to be moved transversely and away from the molded surface in a very gradual manner and without strain upon the molded tooth, and whereby the removal of the shank portion having the enlarged head leaves within the tooth the recess first mentioned plus the undercut recess formed by the enlarged head portion thus removed.

My invention also comprehends details of construction which, together with the features above specified will be better understood by reference to the drawings, in which:—

Figure 1 is a plan view of a mold embodying my invention; Fig. 2 is a cross section on line $x$—$x$ thereof on an enlarged scale; Fig. 3 is an enlarged cross section through the tooth and with one of the mold portions attached; Fig. 4 is a perspective view of the portion of the mold which forms the undercut recess; Fig. 5 is an end view of the same; and Fig. 6 is a cross section of the tooth after it has been completely removed from the mold.

A is the bottom portion of the mold, F is the top portion, and D D are intermediate portions which rest upon a depressed surface C of the lower portion A of the mold, and said parts D D are forced apart into contact with the portions B of the lower part of the mold by a wedge E.

The mold structure, as a whole, employed in the manufacture of teeth is adapted to mold one complete set of teeth at one operation, but this is immaterial to my invention as the latter resides in the mold structure with respect to each one of the teeth, and I will therefore confine my description with respect to the details to the construction and use of the invention in connection with the making of a single tooth.

Referring to Fig. 2, the part B of the base A has a vertical wall against which the part D is pressed by the wedge and the upper surfaces of the two parts D and B coact with the under surface of the top part F of the mold so that when the three portions D, B and F are placed together, there will be formed within them a space $P^2$ which corresponds to the shape required for the tooth. The surplus material over and above that from which the tooth is made squeezes out from between the top portion F of the mold and the lower portions D and B.

Projecting through the outer wall of the portion B and into the mold space for the tooth are the mold parts or core for molding the undercut recess in the attaching part of the tooth; and that the nature and object of these parts may be better understood, I will refer to Fig. 6, which shows a section of the tooth in molded form. In this figure, the front portion of the tooth is represented at P and the part which is to be connected with the rubber or other plate for holding the teeth is indicated at P'. The recess extending into the body of the tooth through the surface P' is indicated at O and has a laterally undercut portion shown at O'. The molding of this undercut recess is a very difficult and delicate operation because of the great frailty of the composition from which the tooth is molded in the condition in which it must be removed from the mold, before being baked or burned to produce the glazed outer surface and vitrified condition of the whole tooth.

The core structure will be fully understood by reference to Figs. 3, 4 and 5, when taken in connection with Fig. 2. A pin H is extended through a hole bored horizontally through the body B of the mold and has its inner end I extended somewhat into the tooth space of the mold. The end I of this part is preferably slightly tapered so as to enable the molded material to be easily withdrawn from it. The upper part of this pin H is filed away to provide a flattened surface, and a detachable core portion K is made to fit upon the pin to correspond to the portion which has been filed away. To limit the adjustment of the part K, I prefer that the end of the pin at J shall remain intact so as to provide a shoulder against which the part K may be adjusted. The end of the part K is flush with the end of the part I and is extended upward in the enlarged head L, which may be flat upon its end and curved on its opposite face M which forms the undercut wall of the recess in the tooth. The curvature of this part M is important and instead of being a circular curve struck from the point $m$ at the lower corner of the head L, it is eccentric to said point, substantially as if described from a point $m'$, so that the distance from the point $m$ to the end $m^2$ is less than the distance from the point $m^3$ for the purpose of enabling the head L to be easily disengaged in respect to contact with the curved part M when withdrawing the said head L by the shank K, as hereinafter described. When the mold is in operative condition, the shank portion K which holds the head L in proper location is temporarily held in position by a pin N which extends through the shank into the body of the pin H.

The operation of my improved mold and method of removing the molded tooth therefrom will now be clearly understood: As before stated, the complete mold is constructed to mold, at one operation, the entire set of upper and lower teeth; and as all of these are duplicates, other than the outward design of the tooth, I will confine myself to the explanation of the use of the mold with respect to the molding of one tooth only. Assuming that the parts F, D and E were removed from the part A B and that the pin H was secured in position through the wall of the part B as a permanent portion of the said part and the inner end I projected into the tooth space as a stud, then I push the shank K through the hole through which the pin H extends until the end of the shank K rests against the abutment J and then insert the pin N. The head L of the shank K will be in accurate alinement with the stud portion I, because the shank K is guided by the pin H and by the hole through which the pin projects. This head L is somewhat less in width than the diameter of the stud portion I of the pin, as will be understood by reference to Figs. 4 and 5, as it is not desired that the undercut portion shall be of a width equal to the diameter of said stud since that would necessitate that the pin H should be cut down to its diameter instead of only slightly along the upper surface. Further, this making of the head narrower than the diameter of the stud will enable the head to be easily withdrawn through the hole formed by the stud without injury to its walls which could not very well be done if it was of a width equal to the diameter of the stud. When the parts are adjusted as above described, they will be in the form shown in the various figures. We may here assume that all of the core pins have been adjusted in the same manner throughout the mold. The mold portions D D are then placed in position and forced outward against the mold portions B B by driving in the wedge E. The material from which the teeth are to be molded is then pressed into the various spaces formed between the parts B and D and the molding operation is completed by compressing this material by forcing down the top mold plate F, said act squeezing out the surplus material. The pressure between the top plate and the rest of the mold may be accomplished in any suitable press. When the molding operation is completed to this extent, the top plate F is lifted off and the surplus material is removed. The wedge E is then driven out and the mold portions D withdrawn, said action liberating the molded teeth from the sides formerly occupied by the mold portions D.

To remove the molded tooth from the mold space, the procedure is as follows: The pin N is removed and the shank K pushed gently with a longitudinal thrust which pushes the molded tooth off the end of the stud I and into position to be grasped with the fingers. The tooth is now withdrawn, together with the head L and its shank K. There will be a recess within the tooth structure back of the head L, as will be understood by reference to Fig. 3 if we imagine the parts H I removed. As the tooth holds pretty snugly to the head L and there is danger of breaking the tooth if roughly handled, the shank K is gently turned about the point $m$ as a fulcrum to produce a sliding motion of the part M in contact with the molded tooth. This loosens the part without tearing the material and this action is facilitated by reason of the fact that the distance between the points $m$ and $m^2$ is greater than the distance between the points $m$ and $m^3$, and hence the slight eccentricity of the curved surface M with respect to the axis of rotation $m$ causes said surface to relieve its pressure upon the molded material in the act of rocking the shank. In this manner the head and shank are gently and positively disconnected and may be easily removed without in the smallest manner injuring the surface of the molded tooth. The space produced by the stud I gives freedom for the oscillation of the shank K; and as the width of the head and shank is less than the width of the recess formed by the part I, it is evident that said head will readily be removed without disturbing the walls of the recessed portion O. It is also evident that by giving to the width of the head L slightly tapering side walls, as indicated in Fig. 5, the said head becomes thickest on a plane through the points $m$ $m^3$ and thinnest transversely across at the edge $m^2$, and hence the portions of the head in being withdrawn will always find a slightly larger transverse width to pass through than is absolutely required, said condition obviating any disturbance of the side walls of the molded recess. This action would be somewhat similar to the action which takes place along the surface M; but I do not limit myself to this narrowing of the head transversely, for while such construction is desirable, it is not necessarily essential, because there is a sufficient body of molded material on each side to provide the necessary strength against breaking of the tooth.

Broadly considered, the particular point of advantage in my improved mold resides in the two-part core portion in which the part for molding the undercut in the recess is so shaped that in the rotation or rocking of this core portion the surface or surfaces of the core relieve themselves from the surface portions of the molded recess; and therefore while I have described my invention in the exact form which I have found most satisfactory in the commercial adaptation of my invention, I do not confine or restrict myself to the details, as these may be modified without departing from the spirit of the invention.

Having now described my invention what I claim as new and desire to secure by Letters Patent, is:—

1. In a mold for molding teeth, the combination of the outer die portions for molding the general configuration of the body of the tooth, combined with means for molding an undercut recess extending into the body of the tooth from one surface thereof, said means consisting of an inwardly directed stud extending into the mold space for the tooth, and a removable core portion supported upon the stud portion and comprising a laterally extending head of less width than the maximum width of the stud portion and removable from the stud portion together with the molded tooth when the latter is being withdrawn from the mold.

2. In a mold for molding teeth, the combination of the outer die portions for molding the general configuration of the body of the tooth, combined with means for molding an undercut recess extending into the body of the tooth from one surface thereof said means consisting of an inwardly directed stud extending into the mold space for the tooth, and a removable core portion supported and guided upon the stud portion and comprising a laterally extending head of less width than the maximum width of the stud portion and removable from the stud portion together with the molded tooth when the latter is being withdrawn from the mold, said head portion having a curved portion in which the curvature is arranged eccentrically with respect to the point of contact of the head portion with the end of the stud portion.

3. In a mold for molding teeth, the combination of the outer die portions for molding the general configuration of the body of the tooth, combined with means for molding an undercut recess extending into the body of the tooth from one surface thereof said means consisting of an inwardly directed stud extending into the mold space for the tooth, and a removable core portion supported and guided upon the stud portion and comprising a shank detachably connected with the stud portion to guide and temporarily hold it in molding position and a laterally extending head of less width than the maximum width of the stud portion said shank to subsequently act as a lever for rocking the head portion when liberating the same from the molded tooth.

4. In a mold for molding teeth, the combination of mold portions for forming the side walls of a space conforming to the shape of a tooth structure, and means for molding an undercut recess in the body of the tooth and extending through one of the surfaces thereof which consists of a stud extending inwardly from one of the mold portions and having a guiding surface, a shank portion supported by the guiding surface of the stud and also projecting into the tooth space and having a laterally projecting head adjacent to the end of the stud portion and said head having a curved face directed away from the stud, and means for detachably securing the shank in position upon the stud.

5. In a mold for molding artificial teeth, the combination of a plurality of mold parts which together form the space for molding the body of the tooth, with means to mold an undercut recess through one of the faces of the tooth consisting of an inwardly directed stud portion having a flattened surface, and a shank extending along the said flattened portion of the stud and into the mold portion from which the stud projects but detachable therefrom and said shank provided with a laterally projecting head extended away from the stud and having its edge farthest from the stud curved.

6. In a mold for molding artificial teeth, the combination of a plurality of mold parts which together form the space for molding the body of the tooth, with means to mold an undercut recess through one of the faces of the tooth consisting of an inwardly directed stud portion having a flattened surface, a shank extending along the said flattened portion of the stud and into the mold portion from which the stud projects but detachable therefrom and said shank provided with a laterally projecting head extended away from the stud and having its edge farthest from the stud curved, and detachable means for temporarily locking the shank and head in position upon the stud but permitting the removal of said shank and head with the molded tooth.

7. In a mold for molding artificial teeth, the combination of a plurality of mold parts which together form the space for molding the body of the tooth, with means to mold an undercut recess through one of the faces of the tooth consisting of an inwardly directed stud portion having a flattened surface, a shank extending along the said flattened portion of the stud and into the mold portion from which the stud projects but detachable therefrom and said shank provided with a laterally projecting head extended away from the stud and having its edge farthest from the stud curved, and detachable means for temporarily locking the shank and head in position upon the stud but permitting the removal of said shank and head with the molded tooth and in which the curvature of the head portion is eccentric with respect to the point of contact between the end of the shank portion and the stud whereby the rocking of the head will enable it to be loosened from the molded tooth.

8. In a mold for molding artificial teeth, the combination of a plurality of mold parts which together form the space for molding the body of the tooth, with means to mold an undercut recess through one of the faces of the tooth consisting of an inwardly directed stud portion having a flattened surface, a shank extending along the said flattened portion of the stud and into the mold portion from which the stud projects but detachable therefrom and said shank provided with a laterally projecting head extended away from the stud and having its edge farthest from the stud curved, and detachable means for temporarily locking the shank and head in position upon the stud but permitting the removal of said shank and head with the molded tooth and in which the distance from the point of contact of the end of the shank portion with the end of the stud to the outer portion of the head portion is less than the distance from the said point in contact with the stud and the curved portion of the head adjacent to the shank, whereby the rocking of the shank and head will cause said head to release itself from frictional contact with the molded tooth without injury thereto.

9. In a mold for molding artificial teeth, the combination of a plurality of mold parts which together form the space for molding the body of the tooth, with means to mold an undercut recess through one of the faces of the tooth consisting of an inwardly directed tapered stud portion having a flattened surface, and a shank extending along the said flattened portion of the stud and into the mold portion from which the stud projects but detachable therefrom and said shank provided with a laterally projecting head of less width than the diameter of the stud extending away from the stud and having its edge farthest from the stud curved.

10. In means for molding an undercut recess in a molded tooth, the combination of a core structure consisting of a stud, combined with a shank detachably connected with the stud and having its end adjacent to the end of the stud provided with a laterally projecting head portion and having its surface which is directed away from the stud made curved and eccentric to the line of contact between the end of the shank and head portion and the end of the stud.

11. In means for molding an undercut recess in a molded tooth, the combination of a core structure consisting of a stud, combined with a shank detachably connected with the stud and having its end adjacent to the end of the stud provided with a laterally projecting head portion and having its surface which is directed away from the stud made curved and eccentric to the line of contact between the end of the shank and head portion and the end of the stud, detachable means for holding the shank and head portion temporarily in position upon the stud, whereby the molded tooth and shank may be withdrawn from the stud before removing the head portion and shank from the molded tooth.

In testimony of which invention, I hereunto set my hand.

THOMAS D. MOORE.

Witnesses:
R. M. HUNTER,
R. M. KELLY.

Copies of this patent may be obtained for five cents each, by addressing the "Commissioner of Patents, Washington, D. C."